(12) United States Patent
Iannaccone et al.

(10) Patent No.: US 9,471,943 B2
(45) Date of Patent: Oct. 18, 2016

(54) USER-SPECIFIED DISTRIBUTION OF STORIES DESCRIBING USER ACTIONS IN A SOCIAL NETWORKING SYSTEM

(71) Applicant: Facebook, Inc., Menlo Park, CA (US)

(72) Inventors: Gianluca Iannaccone, Oakland, CA (US); Han Qin, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 279 days.

(21) Appl. No.: 13/923,081

(22) Filed: Jun. 20, 2013

(65) Prior Publication Data
US 2014/0379483 A1    Dec. 25, 2014

(51) Int. Cl.
G06Q 30/00    (2012.01)
G06Q 99/00    (2006.01)
G06Q 50/00    (2012.01)
G06Q 30/02    (2012.01)

(52) U.S. Cl.
CPC .......... G06Q 50/01 (2013.01); G06Q 30/0269 (2013.01)

(58) Field of Classification Search
CPC combination set(s) only.
See application file for complete search history.

(56) References Cited

U.S. PATENT DOCUMENTS

| | | | |
|---|---|---|---|
| 8,832,854 B1 * | 9/2014 | Staddon | H04L 63/102 705/319 |
| 2008/0182563 A1 * | 7/2008 | Wugofski | G06Q 10/10 455/414.2 |
| 2009/0070334 A1 * | 3/2009 | Callahan | G06F 21/604 |
| 2009/0119167 A1 | 5/2009 | Kendall et al. | |
| 2009/0182589 A1 * | 7/2009 | Kendall | G06Q 10/02 705/5 |
| 2010/0094878 A1 * | 4/2010 | Soroca | G06F 17/30035 707/748 |
| 2010/0138491 A1 * | 6/2010 | Churchill | G06Q 50/00 709/204 |
| 2010/0217670 A1 * | 8/2010 | Reis | G06Q 30/02 705/14.53 |
| 2010/0280860 A1 * | 11/2010 | Iskold | G06Q 50/01 705/319 |
| 2011/0153377 A1 * | 6/2011 | Novikov | G06Q 10/063 705/7.11 |
| 2011/0258049 A1 * | 10/2011 | Ramer | G06F 17/30867 705/14.66 |

(Continued)

OTHER PUBLICATIONS

Hua, M., et al., "Updating Features Based on User Actions in Online Systems," U.S. Appl. No. 13/690,254, filed Nov. 30, 2012.

(Continued)

*Primary Examiner* — Matthew T Sittner
(74) *Attorney, Agent, or Firm* — Fenwick & West LLP (57) ABSTRACT

A social networking system receives a sponsored story request identifying a story describing an action performed by a social networking system user and generates a sponsored story accordingly. The sponsored story request may also include a bid amount and other information for generating a sponsored story from the sponsored story request. When an action is included in a sponsored story presented to a social networking system user, the social networking system notifies the user associated with the action and provides one or more settings regulating inclusion of actions associated with the user in sponsored story requests. For example, settings allow a user to prevent generation of sponsored stories including a specified type of action, a specific action, or multiple actions associated with the user. Hence, the settings allow a user to limit or prevent generation of sponsored stories describing actions associated with the user.

20 Claims, 3 Drawing Sheets

(56) References Cited

U.S. PATENT DOCUMENTS

| | | | |
|---|---|---|---|
| 2012/0084160 A1* | 4/2012 | Badros | G06Q 30/0241 705/14.73 |
| 2012/0089449 A1* | 4/2012 | Yu | G06Q 30/0222 705/14.23 |
| 2012/0101898 A1* | 4/2012 | Kendall | G06Q 30/02 705/14.52 |
| 2012/0158504 A1* | 6/2012 | Kumar | G06Q 30/0255 705/14.53 |
| 2012/0166532 A1 | 6/2012 | Juan et al. | |
| 2013/0030909 A1* | 1/2013 | Shih | G06Q 50/01 705/14.48 |
| 2013/0166726 A1* | 6/2013 | Boldyrev | G06Q 50/01 709/224 |
| 2014/0149219 A1* | 5/2014 | Redfern | G06Q 30/0261 705/14.58 |
| 2014/0188742 A1* | 7/2014 | Deselaers | G06Q 30/0282 705/319 |
| 2014/0344036 A1* | 11/2014 | Serad | G06Q 30/0213 705/14.15 |

OTHER PUBLICATIONS

Kabiljo, I., et al., "Customized Predictors for User Actions in an Online System," U.S. Appl. No. 13/689,969, filed Nov. 30, 2012.

Shalita, A. M., et al., "Dynamic Expressions for Representing Features in an Online System," U.S. Appl. No. 13/690,088, filed Nov. 30, 2012.

Li, N., et al., "Sponsored Stories Application Programming Interface (API)," U.S. Appl. No. 13/539,399, filed Jun. 30, 2012.

Li, N., et al., "Interface for Sponsoring Stories Within a Social Networking System," U.S. Appl. No. 13/539,410, filed Jun. 30, 2012.

* cited by examiner

USER-SPECIFIED DISTRIBUTION OF STORIES DESCRIBING USER ACTIONS IN A SOCIAL NETWORKING SYSTEM

BACKGROUND

This invention generally pertains to social networking, and more specifically to advertising via a social networking system.

Social networks, or social utilities that track and enable connections between users (including people, businesses, and other entities), have become prevalent in recent years and allow users to communicate information more efficiently. For example, a social networking system user may post contact information, background information, job information, hobbies, and/or other user-specific data to the social networking system. Other users can then review the posted data by browsing user profiles or searching for profiles including specific data. Social networking systems also allow users to associate themselves with other users, thus creating a web of connections among the users of the social networking system. These connections among the users can be leveraged by the social networking system to offer more relevant information to each user in view of user-stated interests.

Additionally, social networking systems enable users to interact with other users or objects by performing various actions. For example, users may post comments to pages associated with other users, view images, view video, listen to audio data or perform other actions on various objects maintained by the social networking system. Actions performed by a user are frequently distributed to other users connected to the user who performed the action. Often, social networking systems generate newsfeeds for their users, where various stories in the newsfeed describe actions performed by other users connected to the user viewing the newsfeed. A social networking system may prioritize stories in the newsfeed so that stories likely to be of interest to the viewing user are more readily accessible to the viewing user. For example, stories describing actions performed by users with whom the viewing user frequently interacts or describing actions performed on objects in which the user has a particular interest may be easier to view via the newsfeed.

Users may advertise products or events or otherwise communicate content to other users via a social networking system. For example, content may be described by stories indicating other users' interactions with the social networking system. These stories may be included in newsfeeds presented to social networking system users connected to users performing the interactions. As a user may have different levels of interactions with different social networking system users, the social networking system may determine that some users are not likely to be interested a story describing a user's interaction, which reduces the effectiveness of the social networking system in communicating content. Hence, users may seek to increase the likelihood of a particular story being presented to other social networking system users, allowing more effective communication of content.

SUMMARY

Social networking system users, such as advertisers, may promote certain actions, posts, or other content that is represented in the social networking system. These promotions may take the form of "sponsored story units" including a sponsored story and/or one or more related posts. The sponsored story describes an action taken by a user of a social networking system to whom the viewing user is connected and an object on which the action was taken. For example, the sponsored story may indicate that a particular user listened to an identified song or that the particular user shared a particular link. Hence, a sponsored story leverages information stored by the social networking system about objects in the social networking system and actions performed on various objects maintained by the social networking system.

A social networking system allows a viewing user to receive descriptions of actions performed by other users connected to the viewing user or content associated with objects maintained by the social networking system. To communicate this information to the viewing user, the social networking system may generate a newsfeed for presentation to the viewing user. The newsfeed includes stories describing actions, objects or other content likely to be of interest to the viewing user. For example, the newsfeed includes stories describing actions performed by other users connected to the viewing user. Commonly, the social networking system will select stories for the newsfeed based on the likelihood that the viewing user will be interested in an action, object, user or other content identified by the stories. However, users may compensate the social networking system to increase the likelihood that stories selected by the user are included in the viewing user's newsfeed or that stories selected by the user are readily identified from the viewing user's newsfeed.

To provide sponsored stories to users, the social networking system receives a sponsored story request identifying an action performed by a social networking system user. For example, a sponsored story request identifies a story including an action performed by a social networking system user. The sponsored story request may also include a bid amount and other information for generating a sponsored story including the action identified by the sponsored story request. When a sponsored story describing an action specified by the sponsored story request is presented to a social networking system user, a notification is communicated to a user associated with the action described by the sponsored story. The notification indicates that an action associated with the user was included in a sponsored story presented to an additional social networking system user and includes one or more settings for preventing inclusion of actions associated with the user in sponsored stories. For example, settings allow a user to prevent sponsored stories from including a specified type of action associated with the user, a specific action associated with the user, or multiple actions associated with the user. Additionally, one or more settings may prevent presentation of sponsored stories including an action, or a type of action, associated with the user to other users having one or more characteristics identified by a setting. One or more settings selected by the user are received and stored in a user profile maintained by the social networking system for the user.

After the one or more selected settings are stored in the user profile, the social networking system modifies the sponsored story generated from the sponsored story request. For example, if one or more of the settings prevent inclusion of actions associated with the user in sponsored stories, a description of the action associated with the user is removed from the sponsored story or the sponsored story is deleted. Additionally, if another sponsored story request identifying an action associated with the user is retrieved, the one or more settings from the user's user profile determine if a corresponding sponsored story unit is generated. For example, if a setting prevents inclusion of a specific type of action associated with the user in sponsored stories and a sponsored story request identifies an action associated with the user having the specific type, no sponsored story unit is generated from the sponsored story request. Hence, social networking system users may regulate use of their actions in sponsored story units.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
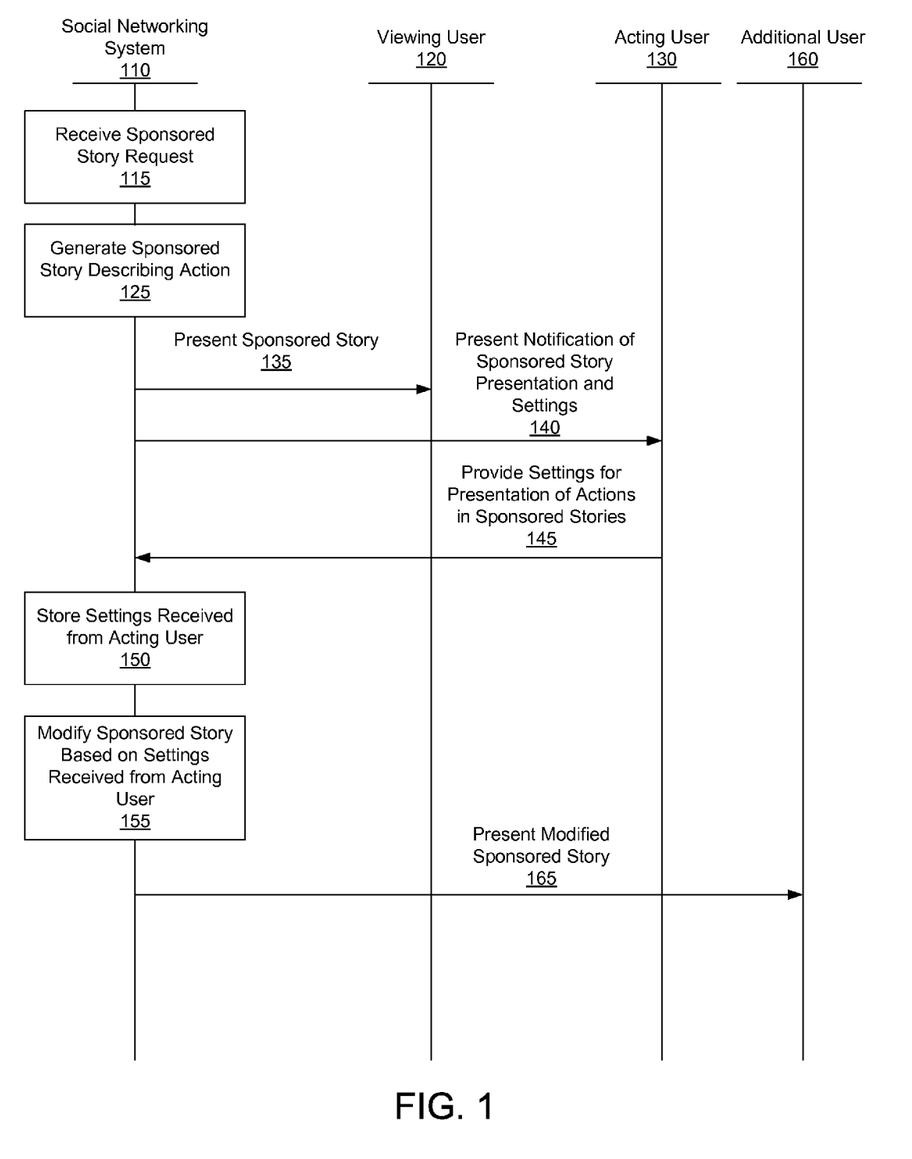
FIG. 1 is an interaction diagram of a method for limiting inclusion of user actions in sponsored stories presented by a social networking system, in accordance with an embodiment of the invention.

FIG. 1 is an interaction diagram 100 of a method for limiting inclusion of user actions in sponsored stories presented by a social networking system 110. Pages associated with different objects are stored and maintained by the social networking system, allowing social networking system users to access information about different objects by accessing a page associated with an object. For example, a page associated with an event includes comments from users about the event, images associated with the event, information describing the event or other information associated with the event. In some embodiments, information about an object is presented as different stories in a newsfeed on the page associated with the event.

Social networking system users may be authorized to promote an object to other users. For example, a user authorized to promote an object (a "promoting user") selects content associated with the object for distribution to other social networking system users. Examples of promoting users include: a page administrator for the page associated with the object, a creator of the object or the page, or another user capable of modifying the object or the page associated with the object. Additionally, in some embodiments, a user may promote content posted to the social networking system 110 by the user or content posted to the social networking system 110 by another social networking system user. This allows various users to increase the likelihood of promoted content being presented to other social networking system users.

A promoting user may also provide parameters specifying how selected content is distributed to other social networking system users. For example, the promoting user may associate targeting criteria with selected content to present the selected content to specific groups of users or to present the selected content for a specified duration. Parameters specifying distribution of selected content may also specify a budget and/or a bid amount to identify compensation provided to the social networking system for presenting the selected content to its users, allowing the promoting user to increase the likelihood that other users receive, or access, the selected content.

In the example of FIG. 1, the social networking system 110 receives 115 a request to generate a sponsored story from a promoting user. The sponsored story request identifies the promoting user, an action associated with a user for inclusion in a sponsored story, a bid amount for presentation of the sponsored story, and may also include one or more parameters as described above. The social networking system 100 may receive 115 the sponsored story request through any suitable communication channel. Examples of channels from which the social networking system 110 receives 115 a sponsored story request are described in U.S. patent application Ser. No. 13/539,399, filed on Jun. 30, 2012, and U.S. patent application Ser. No. 13/539,410, filed on Jun. 30, 2012, each of which is incorporated by reference herein in its entirety.

Based on the sponsored story request, the social networking system 110 generates 125 a sponsored story distributing an action and/or an object identified by the sponsored story request. Embodiments of sponsored stories based on sponsored story requests are described in U.S. application Ser. No. 12/193,702, filed Aug. 18, 2008, published as U.S. Patent Application Publication No. 2009/0119167, which is incorporated in its entirety by reference herein. Hence, the sponsored story request allows the social networking system 110 to generate 125 a story describing the action or object for distribution to social networking system users. In the example shown by FIG. 1, the sponsored story is presented 135 to a viewing user 120 that is connected to another user that performed the action specified by the sponsored story request through any suitable communication channel. For example, the sponsored story is included in a news feed of stories describing actions of other social networking system users that is presented to the viewing user 120 via, for example, an associated client device; the sponsored story may be visually distinguished from other stories included in the news feed presented to the viewing user. If the sponsored story request specifies targeting criteria, the viewing user 120 is a social networking user having one or more of the characteristics specified by the targeting criteria and connected to a user associated with an action, or an object, identified by the sponsored story request.

However, a user associated with the action or with the object identified by the sponsored story request (referred to herein as an "acting user") may desire to limit distribution of its actions or objects to other social networking system users. To allow the acting user 130 to prevent distribution of its associated actions or objects to other social networking system users, in the example of FIG. 1, after initially presenting 135 a sponsored story including an action or an object associated with the acting user 130 to a viewing user 120, the social networking system 100 presents 140 the acting user 130 with a notification via a client device that a sponsored story including an action or object associated with the acting user 130 was presented. The notification may be a pop up window, an email, a text message, or graphical user interface element, or may be provided through any suitable communication channel. The notification includes one or more settings allowing the acting user 130 to regulate presentation of actions or objects associated with the acting user 130 in sponsored stories. For example, the notification includes settings allowing the acting user 130 to prevent inclusion of one or more actions in sponsored stories based on the promoting user (e.g., opt out of sponsored stories from NIKE®), to prevent inclusion of specified types of actions in sponsored stories, to prevent inclusion of the action included in the presented sponsored story to additional social networking system users, to prevent presentation of sponsored stories including an action or a type of action to users identified by the setting, or some combination thereof. While FIG. 1 shows presentation 140 of the notification to the acting user 130 after initial presentation of a sponsored story including an action or an object associated with the acting user, in other embodiments the social networking system 100 presents 140 the notification to the acting user 130 via, for example, the associated client device, when the sponsored story request including an action or an object associated with the acting user is received 115.

From the presented notification, the acting user 145 provides the social networking system 110 with one or more settings regulating distribution of actions or objects associated with the acting user 130 via sponsored stories. The social networking system 110 stores 150 the received settings in a user profile associated with the acting user, allowing the social networking system 110 to apply the provided settings to regulate subsequent generation of sponsored stories describing actions or objects associated with the acting user 130. For example, the social networking system 130 does not generate a sponsored story based on a subsequently received sponsored story request including a type of action that an acting user 130 has prevented from being distributed in a sponsored story by specifying one or more settings. As another example, a sponsored story describing an action associated with the acting user 130 is not presented to users having a characteristic (e.g., a type of connection go the acting user 130) specified by a setting selected by the acting user 130. By storing 150 the acting user's 130 settings for presentation of actions or objects, the social networking system 110 allows the acting user 130 to prevent its actions, or certain actions, from being shared with other social networking system users via sponsored stories.

After receiving one or more settings from the acting user 130 subsequent to presentation 135 of a sponsored story describing an action associated with the acting user 130 to a viewing user 120, the social networking system 110 modifies 155 the sponsored story describing the action associated with the acting user based on the one or more settings. For example, the social networking system 100 prevents the sponsored story from being presented to users identified by a setting. As another example, the social networking system 100 removes information describing the action from the sponsored story if the setting prevents presentation of the type of action or specific action to other social networking system users. The modified sponsored story is then presented to an additional user 160 via, for example, an associated client device, allowing the promoting user to present information to the additional user 160 without including information that the acting user 130 prevents from presentation to additional users. Alternatively, the social networking system 110 deletes the sponsored story to prevent subsequent presentation of the sponsored story to social networking system users and presents alternative content to the additional user 160.

System Architecture

Figure 2:
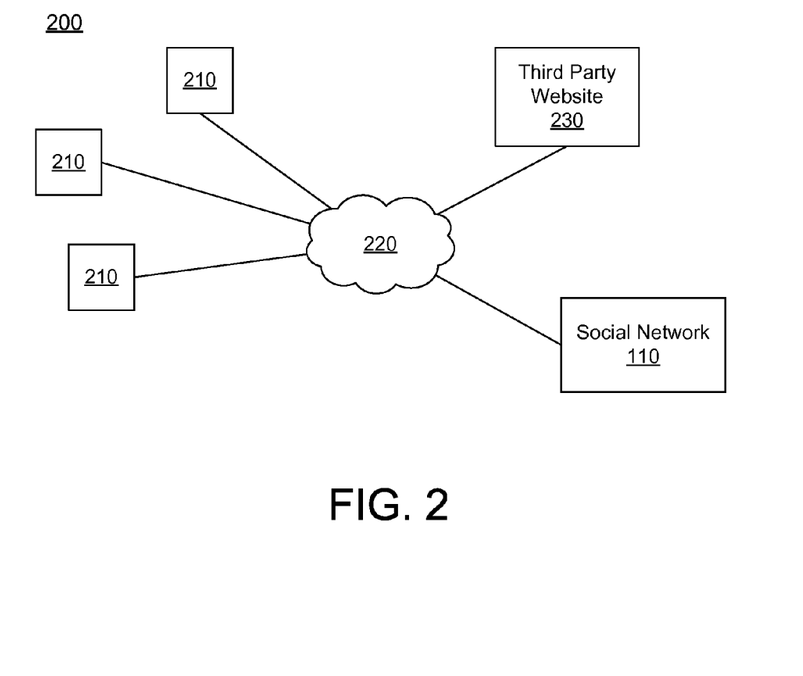
FIG. 2 is a high level block diagram illustrating a system environment suitable for operation of a social networking system, in accordance with an embodiment of the invention.

FIG. 2 is a block diagram of a system environment 200 for a social networking system 110. The system environment 200 shown by FIG. 2 comprises one or more client devices 210, a network 220, one or more third-party systems 230, and the social networking system 110. In alternative configurations, different and/or additional components may be included in the system environment 200. The embodiments described herein can be adapted to online systems that are not social networking systems.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone or another suitable device. A client device 210 is configured to communicate via the network 220. In one embodiment, a client device 210 executes an application allowing a user of the client device 210 to interact with the social networking system 110. For example, a client device 110 executes a browser application to enable interaction between the client device 210 and the social networking system 110 via the network 220. In another embodiment, a client device 210 interacts with the social networking system 110 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the social networking system 110, which is further described below in conjunction with FIG. 3. In one embodiment, a third party system 230 is an application provider communicating information describing applications for execution by a client device 210 or communicating data to client devices 210 for use by an application executing on the client device. In other embodiments, a third party system 230 provides content or other information for presentation via a client device 210. A third party system 230 may also communicate information to the social networking system 110, such as advertisements, content, or information about an application provided by the third party system 230.

Figure 3:
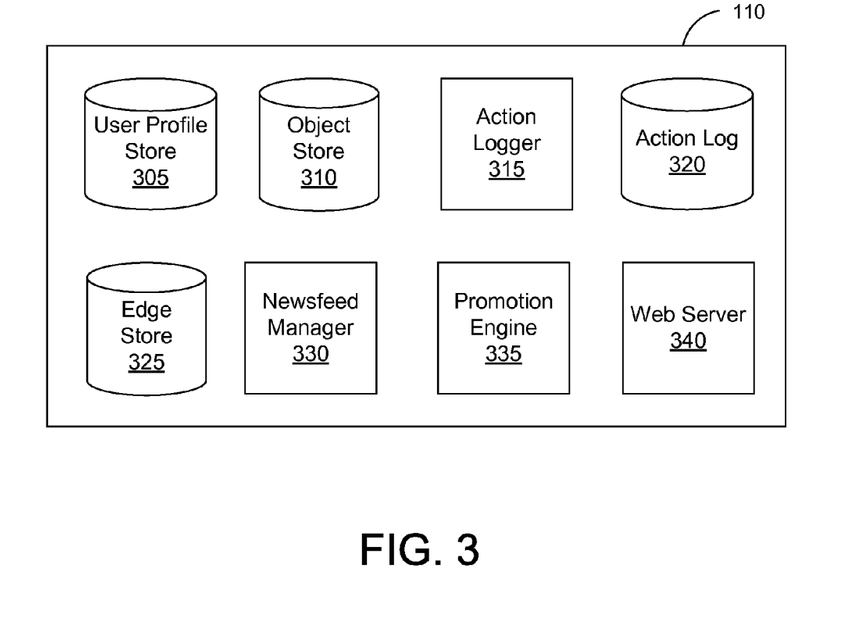
FIG. 3 is a block diagram of a social networking system, in accordance with an embodiment of the invention.

FIG. 3 is an example block diagram of an architecture of the social networking system 110. The social networking system 110 shown in FIG. 3 includes a user profile store 305, a content store 310, an action logger 315, an action log 320, an edge store 325, a newsfeed generator 330, a promotion engine 335, and a web server 340. In other embodiments, the social networking system 110 may include additional, fewer, or different components for various applications. Conventional components such as network interfaces, security functions, load balancers, failover servers, management and network operations consoles, and the like are not shown so as to not obscure the details of the system architecture.

Each user of the social networking system 110 is associated with a user profile, which is stored in the user profile store 305. A user profile includes declarative information about the user that was explicitly shared by the user and may also include profile information inferred by the social networking system 110. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 305 may also maintain references to actions by the corresponding user performed on content items in the content store 310 and stored in the action log 320.

As described above in conjunction with FIG. 1, a user profile includes one or more settings specified by the corresponding user authorizing or restricting use of actions or objects associated with the user in sponsored stories. Stored settings may indicate one or more types of actions that are prevented from inclusion in sponsored stories or may indicate specific actions prevented from inclusion in sponsored stories. For example, a blacklist identifying actions and/or types of actions prevented from inclusion in sponsored stories is stored in a user's user profile. Additionally, one or more settings may indicate users or characteristics of users prevented from receiving sponsored stories including an action associated with a user or prevented from receiving sponsored stories including a type of action associated with the user. For example, a setting specifies user identifiers associated with a type of action to prevent users corresponding to the user identifiers from receiving a sponsored story describing an action associated with the user having the specified type. As another example, a setting identifies a type of connection between the user and additional users to prevent additional users connected to the user by the specified type of connection from receiving sponsored stories describing an action associated with the user.

While user profiles in the user profile store 305 are frequently associated with individuals, allowing individuals to interact with each other via the social networking system 110, user profiles may also be stored for entities such as businesses or organizations. This allows an entity to establish a presence on the social networking system 110 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 310, such as status updates, photos tagged by users to be associated with other objects in the social networking system, events, groups or applications. In some embodiments, objects are received from third-party applications or third-party applications separate from the social networking system 110. In one embodiment, objects in the content store 310 represent single pieces of content, or content "items." Hence, social networking system users are encouraged to communicate with each other by posting text and content items of various types of media to the social networking system 110 through various communication channels. This increases the amount of interaction of users with each other and increases the frequency with which users interact within the social networking system 110.

The action logger 315 receives communications about user actions internal to and/or external to the social networking system 110, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 320.

The action log 320 may be used by the social networking system 110 to track user actions on the social networking system 110, as well as actions on third party systems XX30 that communicate information to the social networking system 110. Users may interact with various objects on the social networking system 110, and information describing these interactions is stored in the action log 320. Examples of interactions with objects include: commenting on posts, sharing links, checking-in to physical locations via a mobile device, accessing content items, and any other suitable interactions. Additional examples of interactions with objects on the social networking system 110 that are included in the action log 320 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 320 may record a user's interactions with advertisements on the social networking system 110 as well as with other applications operating on the social networking system 110. In some embodiments, data from the action log 320 is used to infer interests or preferences of a user, augmenting the interests included in the user's user profile and allowing a more complete understanding of user preferences.

The action log 320 may also store user actions taken on a third party system XX30, such as an external website, and communicated to the social networking system 110. For example, an e-commerce website may recognize a user of a social networking system 110 through a social plug-in enabling the e-commerce website to identify the user of the social networking system 110. Because users of the social networking system 110 are uniquely identifiable, e-commerce websites, such as in the preceding example, may communicate information about a user's actions outside of the social networking system 110 to the social networking system 110 for association with the user. Hence, the action log 320 may record information about actions users perform on a third party system 230, including webpage viewing histories, advertisements that were engaged, purchases made, and other patterns from shopping and buying.

In one embodiment, the edge store 325 stores information describing connections between users and other objects on the social networking system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 110, such as expressing interest in a page on the social networking system 110, sharing a link with other users of the social networking system 110, and commenting on posts made by other users of the social networking system 110.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 110, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the social networking system 110 over time to approximate a user's interest in an object or in another user in the social networking system 110 based on the actions performed by the user. A user's affinity may be computed by the social networking system 110 over time to approximate a user's interest for an object, interest, or interest for another user in the social networking system 110 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

In one embodiment, the social networking system 110 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 330 may generate stories for presentation to a user based on information in the action log 320 and in the edge store 325 or may select candidate stories included in the content store 310. One or more of the candidate stories are selected and presented to a user by the newsfeed manager 330.

For example, the newsfeed manager 330 receives a request to present one or more stories to a social networking system user. The newsfeed manager 330 accesses one or more of the user profile store 305, the content store 310, the action log 320, and the edge store 325 to retrieve information about the identified user. For example, stories or other data associated with users connected to the identified user are retrieved. The retrieved stories or other data are analyzed by the newsfeed manager 330 to identify content likely to be relevant to the identified user. For example, stories associated with users not connected to the identified user or stories associated with users for which the identified user has less than a threshold affinity are discarded as candidate stories. Based on various criteria, the newsfeed manager 330 selects one or more of the candidate stories for presentation to the identified user.

In various embodiments, the newsfeed manager 330 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 305. The newsfeed manager 330 may also determine the order in which selected stories are presented via the newsfeed. For example, the newsfeed manager 330 determines that a user has a highest affinity for a specific user and increases the number of stories in the newsfeed associated with the specific user or modifies the positions in the newsfeed where stories associated with the specific user are presented.

The newsfeed manager 330 may also account for actions by a user indicating a preference for types of stories and selects stories having the same, or similar, types for inclusion in the newsfeed. Additionally, newsfeed manager 330 may analyze stories received by social networking system 110 from various users to obtain information about user preferences or actions from the analyzed stories. This information may be used to refine subsequent selection of stories for newsfeeds presented to various users.

When generating a newsfeed, the newsfeed manager 330 may select or rank stories based on a variety of data. For example, stories may be ranked based on an affinity score between the user that the story is associated with and the user to whom the newsfeed is being generated. Additionally, the newsfeed manager 330 may account for bid amounts or budgets associated with a story by a promoting user and modify the likelihood of a story being included in a newsfeed based on the bid amounts and/or budget. Hence, the newsfeed manager 330 allows a promoting user, or an advertiser, to increase the likelihood that a story is included in a newsfeed by compensating the social networking system 110 for including the story in a newsfeed (i.e., allowing the user to "sponsor" the story). This allows users authorized to promote an object may provide the social networking system 110 with data customizing how interactions with the object are presented to different users.

In one embodiment, the newsfeed manager 330 identifies candidate stories for presentation to a viewing user and calculates a score for each of the candidate stories. The candidate stories may be ranked based on their corresponding scores with the ranking used to select stories for presentation to the viewing user. The score of a candidate story may be based on an organic value based on an affinity score and/or other measures of the likelihood of the viewing user having an interest in the score as well as a sponsored value based on the bid amount associated with the candidate story. For stories that are not sponsored, the sponsored value is zero, so the score of the story is the organic value.

The promotion engine 335 receives requests to generate sponsored stories from one or more users and retrieves one or more settings from user profiles associated with users associated with actions or objects identified by the sponsored story requests ("acting users"). Based on the settings from the user profile of the acting user, the promotion engine 335 determines whether to generate a sponsored story from a sponsored story request or whether to present a generated sponsored story to a user. Retrieving one or more settings associated with an acting user corresponding to an action or object in a sponsored story request allows the social networking system 110 to preserve the acting user's privacy by limiting presentation or generation of sponsored stories subject to the acting user's settings for distribution of its actions. Use of an acting user's settings in presentation of sponsored stories is further described below in conjunction with FIG. 4.

The web server 340 links the social networking system 110 via the network 220 to the one or more client devices 210, as well as to the one or more third party systems 230. The web server 340 serves web pages, as well as other content, such as JAVA®, FLASH®, XML and so forth. The web server 340 may receive and route messages between the social networking system 110 and the client device 210, for example, instant messages, queued messages (e.g., email), text messages, short message service (SMS) messages, or messages sent using any other suitable messaging technique. A user may send a request to the web server 340 to upload information (e.g., images or videos) that are stored in the content store 310. Additionally, the web server 340 may provide application programming interface (API) functionality to send data directly to native client device operating systems, such as IOS®, ANDROID™, WEBOS® or RIM®.

Modification of Sponsored Story Presentation Based on User Settings

Figure 4:
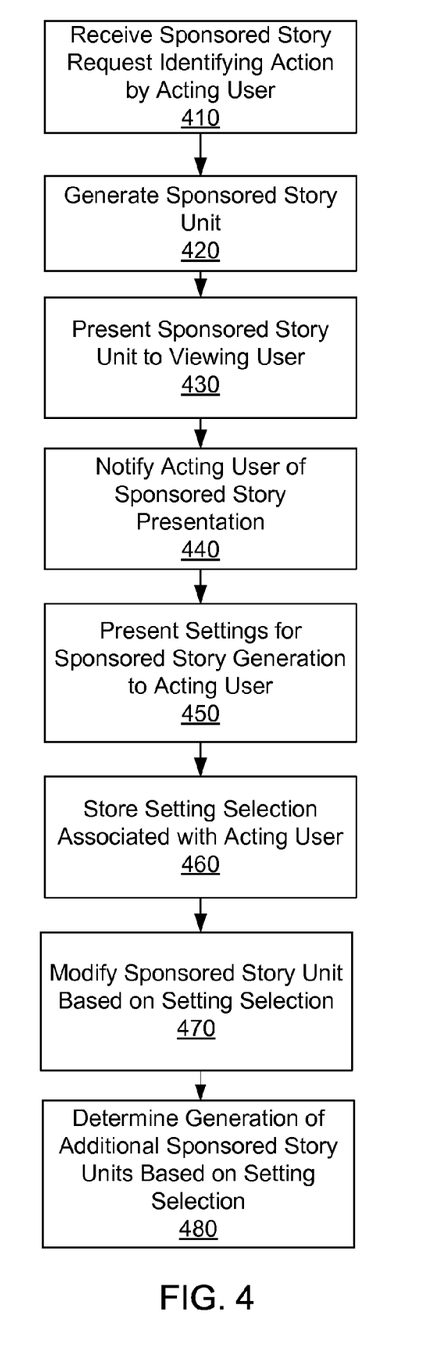
FIG. 4 is a flow chart of a method for limiting inclusion of actions in sponsored stories presented by a social networking system, in accordance with an embodiment of the invention.

FIG. 4 shows one embodiment of a method for limiting inclusion of actions in sponsored stories presented by a social networking system 110. The social networking system 110 receives 410 a request to generate a sponsored story (a "sponsored story request") that identifies an action associated with an acting user. In some embodiments, the sponsored story request may identify an object associated with the acting user, such as a page post. A bid amount specifying an amount the social networking system 110 receives from a user providing the sponsored story request for presentation of the sponsored story to users is also specified by the sponsored story request. As described above in conjunction with FIG. 1, the sponsored story request may also specify one or more parameters regulating presentation of the corresponding sponsored story to other users. In various embodiments, the social networking system 110 receives 410 the sponsored story request through any suitable communication channel. Examples of channels from which the social networking system 110 receives 410 a sponsored story request are described in U.S. patent application Ser. No. 13/539,399, filed on Jun. 30, 2012, and U.S. patent application Ser. No. 13/539,410, filed on Jun. 30, 2012, each of which is incorporated by reference herein in its entirety.

Based on the sponsored story request, the social networking system 110 generates 420 a sponsored story describing the action or the object identified by the sponsored story request. Embodiments of sponsored stories based on sponsored story requests are described in U.S. application Ser. No. 12/193,702, filed Aug. 18, 2008, published as U.S. Patent Application Publication No. 2009/0119167, which is incorporated in its entirety by reference herein. The generated sponsored story is presented 430 to a viewing user. For example, the sponsored story is included in a news feed along with other stories presented 430 to the viewing user.

When the sponsored story is presented 430 to the viewing user (e.g., via an associated client device), the social networking system 110 notifies 440 (e.g., via an associated client device) the acting user that a sponsored story describing an action or an object associated with the acting user was presented. For example, after the sponsored story is presented 430 to a single viewing user, the social networking system 110 notifies 440 the acting user that a sponsored story describing an action or object associated with the acting user has been presented 430. For example, a notification indicating that a sponsored story associated with the acting user is included in an action log indicating actions associated with the acting user; when the user accesses the action log, the notification is presented to the acting user.

One or more settings are presented 450 (e.g., via the associated client device) when the acting user is notified 440 of presentation of the sponsored stories. The settings identify actions or types of actions, allowing the acting user to select a setting to prevent an action or a type of action from being presented to other users through a sponsored story. For example, the settings identify the action included in the presented sponsored story and one or more actions similar to the action included in the presented sponsored story; by selecting a setting, the acting user prevents presentation of a sponsored story including an action corresponding to the selected setting to other users. A setting may allow the acting user to prevent presentation of sponsored stories describing an action performed by the user based on characteristics of the user from which the sponsored story request was received. For example, the acting user identifies types of users so that sponsored stories describing an action associated with the user and received from an identified type of user do not result in presentation of a sponsored story. This allows the acting user to prevent dissemination of sponsored stories describing the acting user's actions by applications or by other entities.

In some embodiments, the settings also allow the acting user to specify characteristics of additional social networking system users that are not presented with sponsored stories describing an action or an object associated with the acting user. For example, the acting user identifies one or more users or characteristics of additional users or identifies a type of connection between the acting user and other users; sponsored stories describing an action or an object associated with the acting user are not presented to the identified users or to users connected to the acting user by the specified type of connection. The acting user may specify various combinations of actions, types of actions, users, and user characteristics to regulate distribution of actions or objects associated with the acting user via sponsored stories.

One or more settings selected by the acting user for presentation of information associated with the acting user via sponsored stories are stored 460 in a user profile associated with the user. Additionally, the sponsored story describing an action or an object associated with the acting user and presented 430 by the social networking system 110 is modified 470 based on the settings received from the user. For example, if the acting user prevents the action described by the sponsored story from presentation to other users, the description of the action is removed from the sponsored story and the modified sponsored story is presented. As another example, the sponsored story is not presented to users identified by a received setting. Alternatively, the social networking system 110 deletes the sponsored story if the acting user prevents presentation of the described action to other users.

When the social networking system 110 receives an additional request to generate a sponsored story describing an action or an object associated with the acting user, the settings included in the acting user's user profile are retrieved. Based on the action or object identified by the sponsored story request and the acting user's settings, the social networking system 110 determines 480 whether to generate the requested sponsored story or how to present a generated sponsored story. For example, if the additional sponsored story request includes an action having an action type prevented from presentation to additional users by the acting user's settings, a sponsored story is not generated based on the additional sponsored story request. As another example, if the acting user's settings prevent distribution of a sponsored story describing a specified action to additional users having a specific type of connection to the acting user, a sponsored story describing the action is not presented to users having the specified type of connection to the acting user.

While the preceding examples describe embodiments where the settings specified by the acting user specify criteria for preventing distribution of sponsored stories associated with the acting user, in other embodiments, one or more of the stored settings identify criteria for permitting presentation of sponsored stories associated with the viewing user. For example, a setting identifies actions or type of actions that the acting user authorizes for presentation to other users via sponsored stories. As another example, a setting authorizes generation of sponsored stories describing actions or objects associated with the viewing user based on sponsored story requests received from identified users or types of users. Similarly, one or more settings may identify users or types of users that are authorized to receive sponsored stories describing actions or specified types of actions associated with the acting user. In additional embodiments, the settings allow the acting user to identify any combination of criteria authorizing and preventing presentation of sponsored stories describing actions or objects associated with the acting user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing a sponsored story unit to one or more client devices for initial presentation to one or more users of the social networking system connected to an acting user of the social networking system, the sponsored story unit including descriptions of a first action and a second action associated with the acting user;
responsive to the initial presentation of the sponsored story unit to the one or more users of the social networking system, providing instructions to a client device associated with the acting user that cause the client device to present a notification to the acting user, the notification including information describing the presented sponsored story unit including the descriptions of the first and the second action associated with the acting user and including one or more settings for preventing inclusion of the first action associated with the acting user in one or more sponsored story units, wherein the one or more settings at least identify an action prevented from inclusion in the one or more sponsored story units based on the identity of a promoting user that provided the one or more sponsored story units;

receiving one or more selected settings included in the notification from the client device associated with the acting user, the selected settings identifying the first action to be prevented from inclusion in the one or more sponsored story units;

storing the one or more selected settings in a user profile associated with the acting user and maintained by the social networking system; and modifying the sponsored story unit for presentation based on the one or more selected settings, the modified sponsored story unit not including a description of the first action.

2. The method of claim 1, wherein modifying the sponsored story unit for presentation based on the one or more selected settings comprises:

removing the description of the first action associated with the acting user from the sponsored story unit.

3. The method of claim 1, wherein modifying the sponsored story unit for presentation based on the one or more selected settings comprises:

deleting the sponsored story unit.

4. The method of claim 1, further comprising:

receiving an additional sponsored story request identifying an additional action associated with the acting user of a social networking system;

retrieving the one or more selected settings from the user profile associated with the acting user;

determining whether to generate an additional sponsored story unit based on the one or more selected settings and the additional action identified by the additional sponsored story request; and generating the additional sponsored story unit responsive to the one or more selected settings do not prevent inclusion of the additional action in one or more sponsored story units.

5. The method of claim 1, wherein a setting, of the one or more settings for preventing inclusion of the first action associated with the acting user in one or more sponsored story units, identifies a specific action.

6. The method of claim 1, wherein a setting for preventing inclusion of the first action associated with the acting user in one or more sponsored story units further identifies one or more from a group consisting of: an action prevented from inclusion in one or more sponsored story units, a type of action prevented from inclusion in one or more sponsored story units, a user prevented from being presented with a sponsored story unit including the action associated with the acting user, a group of users prevented from being presented with the sponsored story unit including the action associated with the acting user, a type of connection between the acting user and one or more users, and any combination thereof.

7. The method of claim 1, wherein a setting, of the one or more settings for preventing inclusion of the first action associated with the acting user in one or more sponsored story units, identifies a user and prevents generation of one or more sponsored story units based on sponsored story requests received from the identified user.

8. The method of claim 1, wherein a setting, of the one or more settings for preventing inclusion of the first action associated with the acting user in one or more sponsored story units, identifies a type of user and prevents generation of one or more sponsored story units based on sponsored story requests received from the identified type of user.

9. The method of claim 8, wherein the type of user comprises an application.

10. A method comprising:

receiving a sponsored story request, the sponsored story request identifying a story describing a first action and a second action associated with an acting user of a social networking system and stored by the social networking system;

retrieving a setting included in a user profile associated with the acting user, the setting including one or more user-specified conditions for generating a sponsored story unit including descriptions of the first action and the second action associated with the acting user, wherein the setting at least identifies an action prevented from inclusion in the one or more sponsored story units based on the identity of a promoting user that provided the one or more sponsored story unit;

determining whether to generate a sponsored story unit based on the received sponsored story request based at least in part on the setting included in the user profile associated with the acting user and the first action and the second action identified by the sponsored story request; and providing the sponsored story unit for initial presentation to a user of the social networking system connected to the acting user responsive to determining to generate the sponsored story unit.

11. The method of claim 10, further comprising:

retrieving a second setting included in the user profile, wherein the second setting includes one or more user-specified conditions for generating the sponsored story unit, including descriptions of the first action and the second action associated with the acting user identifies a specific action.

12. The method of claim 10, wherein the setting including one or more user-specified conditions for generating the sponsored story unit including descriptions of the first action and the second action associated with the acting user further identifies one or more from a group consisting of: an action prevented from inclusion in one or more sponsored story units, a type of action prevented from inclusion in one or more sponsored story units, a user prevented from being presented with a sponsored story unit including the action associated with the acting user, a group of users prevented from being presented with the sponsored story unit including the action associated with the acting user, a type of connection between the acting user and one or more users, and any combination thereof.

13. The method of claim 10, further comprising:

retrieving a second setting included in the user profile, wherein the second setting includes one or more user-specified conditions for generating the sponsored story unit including one or more actions associated with the acting user identifies a user and prevents generation of one or more sponsored story units based on sponsored story requests received from the identified user.

14. The method of claim 10, further comprising:

retrieving a second setting included in the user profile, wherein the second setting includes one or more user-specified conditions for generating the sponsored story unit including one or more actions associated with the acting user identifies a type of user and prevents generation of one or more sponsored story units based on sponsored story requests received from the identified type of user.

15. The method of claim 14, wherein the type of user comprises an application.

16. A method comprising:

receiving a sponsored story request, the sponsored story request identifying a first action and a second action associated with an acting user of a social networking system associated with a client device and stored by the social networking system;

generating a sponsored story unit including descriptions of the first action and the second action associated with the acting user for presentation to one or more users of the social networking system connected to the acting user based on the sponsored story request describing the identified story;

providing the sponsored story unit to one or more client devices for initial presentation to one or more users of the social networking system connected to the acting user;

providing to the client device for the initial presentation to the acting user a notification, the notification including information describing the presented sponsored story unit including the descriptions of the first action and the second action associated with the acting user and including one or more settings for preventing inclusion of the first action associated with the acting user in one or more sponsored story units, wherein the one or more settings at least identify an action prevented from inclusion in the one or more sponsored story units based on the identity of a promoting user that provided the one or more sponsored story units;

receiving one or more selected settings included in the notification from the acting user; and storing the one or more selected settings in a user profile associated with the acting user and maintained by the social networking system.

17. The method of claim 16, further comprising:

modifying the sponsored story unit for presentation based on the one or more selected settings.

18. The method of claim 17, wherein modifying the sponsored story unit for presentation based on the one or more selected settings comprises:

deleting the sponsored story unit.

19. The method of claim 17, wherein a setting, of the one or more settings for preventing inclusion of the first action associated with the acting user in one or more sponsored story units further identifies one or more from a group consisting of: an action prevented from inclusion in one or more sponsored story units, a type of action prevented from inclusion in one or more sponsored story units, a user prevented from being presented with a sponsored story unit including the action associated with the acting user, a group of users prevented from being presented with the sponsored story unit including the action associated with the acting user, a type of connection between the acting user and one or more users, and any combination thereof.

20. The method of claim 17, wherein a setting, of the one or more settings for preventing inclusion of the first action associated with the acting user in one or more sponsored story units, identifies a type of user and prevents generation of one or more sponsored story units based on sponsored story requests received from the identified type of user.

* * * * *